United States Patent [19]
Wyffels et al.

[11] Patent Number: 5,878,557
[45] Date of Patent: Mar. 9, 1999

[54] DERATING THE ENGINE OF A COMBINE IN RESPONSE TO USAGE

[75] Inventors: Michael Keith Wyffels, Geneseo; Philip Alan Harden, Colona, both of Ill.

[73] Assignee: Deere & Company, Moline, Ill.

[21] Appl. No.: 59,494

[22] Filed: Apr. 13, 1998

[51] Int. Cl.⁶ .................................................. A01D 34/03
[52] U.S. Cl. .................. 56/13.5; 56/10.2 R; 56/14.5; 460/1
[58] Field of Search .................. 56/10.2 R, 10.29, 56/10.23, 14.5, 14.6, DIG. 15; 460/1, 3, 6

[56] References Cited

U.S. PATENT DOCUMENTS

| | | |
|---|---|---|
| 3,659,618 | 5/1972 | Kobald et al. .................................. 460/1 |
| 4,466,231 | 8/1984 | Rowland-Hill et al. .................. 56/14.6 |
| 4,487,002 | 12/1984 | Kruse et al. .................................. 460/6 |
| 4,522,553 | 6/1985 | Nelson et al. . |
| 4,934,985 | 6/1990 | Strubbe .............................. 56/DIG. 15 |
| 4,967,544 | 11/1990 | Ziegler et al. ........................ 56/10.2 R |
| 5,488,817 | 2/1996 | Paquet et al. ........................ 56/10.2 R |
| 5,777,072 | 7/1998 | Herlitzius et al. .................... 56/10.2 R |

*Primary Examiner*—Thomas B. Will
*Assistant Examiner*—Arpad F. Kovacs

[57] ABSTRACT

An agricultural combine having an internal combustion engine for driving the various assemblies on the combine. An electronic engine controller is used to monitor and control the operation of the engine. Sensors provide inputs to the electronic engine controller. In response to the inputs from these sensors the electronic engine controller controls the output of the engine. The straw chopper, the propulsion assembly, the separating assembly and the harvesting assembly are provided with on/off switches that are in communication with the electronic engine controller. These on/off switches located in the operator's cab of the combine which are used to activate these crop processing assemblies. In response to an off signal by one or more of these switches the maximum power level is decreased accordingly.

4 Claims, 3 Drawing Sheets

//////# DERATING THE ENGINE OF A COMBINE IN RESPONSE TO USAGE

BACKGROUND OF THE INVENTION

1. Field of the Invention

The invention is directed to a combine powered by an internal combustion engine that is controlled by electronic engine controller wherein the engine controller derates the engine if certain crop processing assemblies are not used.

2. Description of the Prior Art

Combines are large agricultural machines used to harvest, thresh, separate and clean an agricultural crop. Combines are provided with a grain tank for temporarily storing clean grain before it is unloaded to a grain cart or truck by an unloading auger. These machines are usually self propelled and maybe provided with additional crop processing assemblies like straw choppers and chaff spreaders.

Controlling and managing the residue the combine deposits on the ground is becoming a more significant issue. Many times this requires finer/shorter straw length which requires more straw chopper power and thus more engine power. In addition, the farmer's desire for increased machine productivity also requires more engine power, much of which is consumed in propelling the combine and powering the harvesting equipment.

When these systems are not in use and are not consuming their usual power, this power is available for other machines functions, notably separating. Such a situation may exceed the capacity of the separator drives causing damage to the separator. At the present time a combine designer overcomes this potential problem by designing separator drives to handle full engine power in all occasions when the straw chopper is not being used or the machine is stationary with the harvesting equipment disengaged, as when powering out a plug of crop material caught in the separator. The separator typically consumes about one third of the total engine power under normal operations. Designing for this worst case scenario with today's higher engine powers adds to machine weight and cost.

U.S. Pat. No. 4,522,553 discloses a combine with a power boost arrangement wherein the engine power is boosted by the electronic control unit when operation of the unloading auger is detected.

SUMMARY OF THE INVENTION

It is an object of the present invention to derate engine power when various combine systems are deactivated. Conversely it is another object of this invention to increase the power from the engine when these combine systems are reactivated.

The combine of the present invention is provided with an internal combustion engine for driving the various assemblies on the combine. An electronic engine controller is used to monitor and control the operation of the engine. Sensors provide inputs to the electronic engine controller. In response to the inputs from these sensors the electronic engine controller controls the output of the engine.

The first sensor is in communication with the electronic engine controller and detects of the if the straw chopper is engaged. The second sensor is also in communication with the electronic engine controller and detects of the propulsion system is engaged. The third and fourth sensors are also in communication with the electronic engine controller and detect of the harvesting equipment is engaged and if the separator is engaged, respectively. These sensor comprises the four on/off switches located in the operator's cab of the combine which are used to activate these crop processing assemblies.

DESCRIPTION OF THE PREFERRED EMBODIMENT

Figure 1:
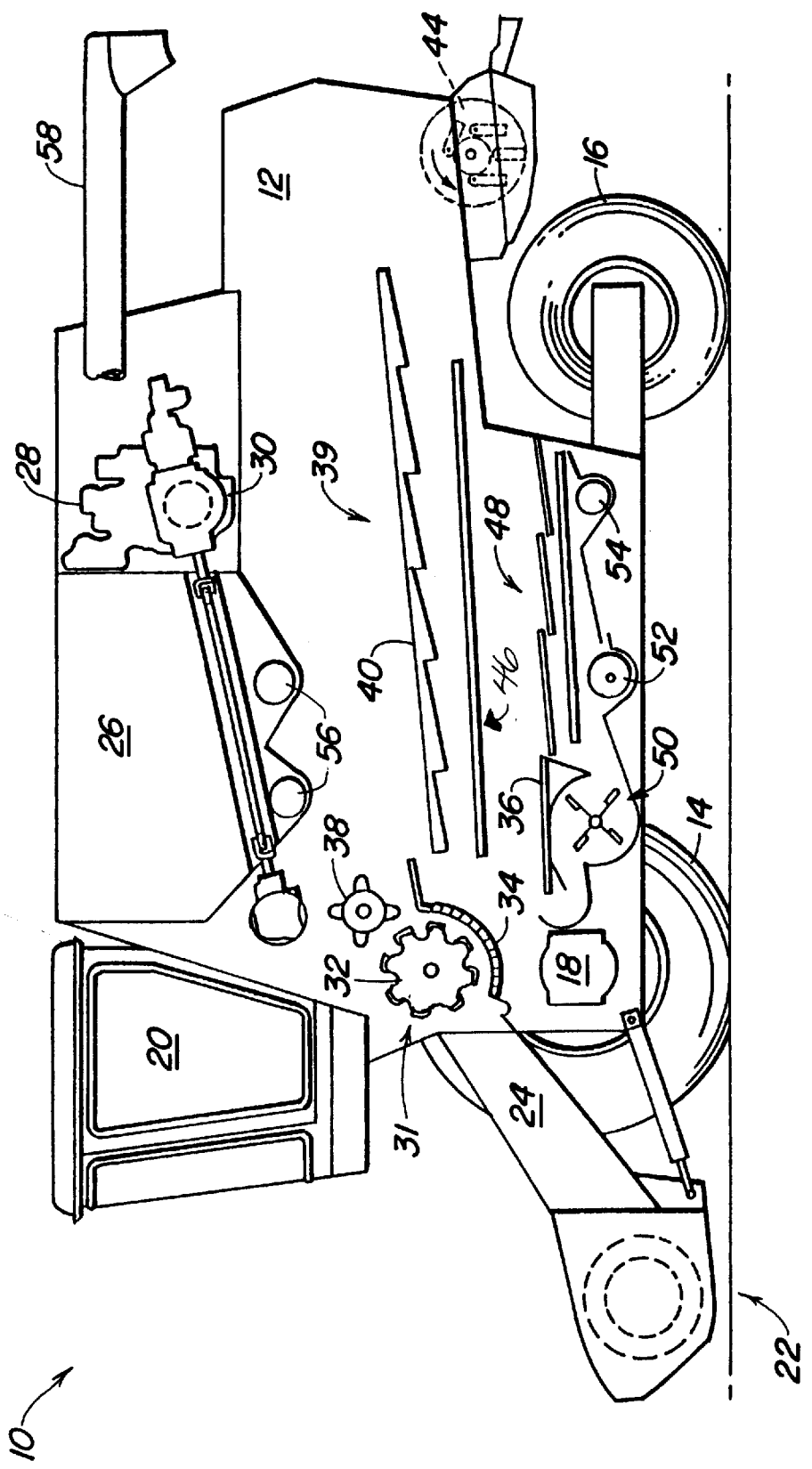
FIG. 1 is a semi-schematic side view of a combine.
Figure 2:
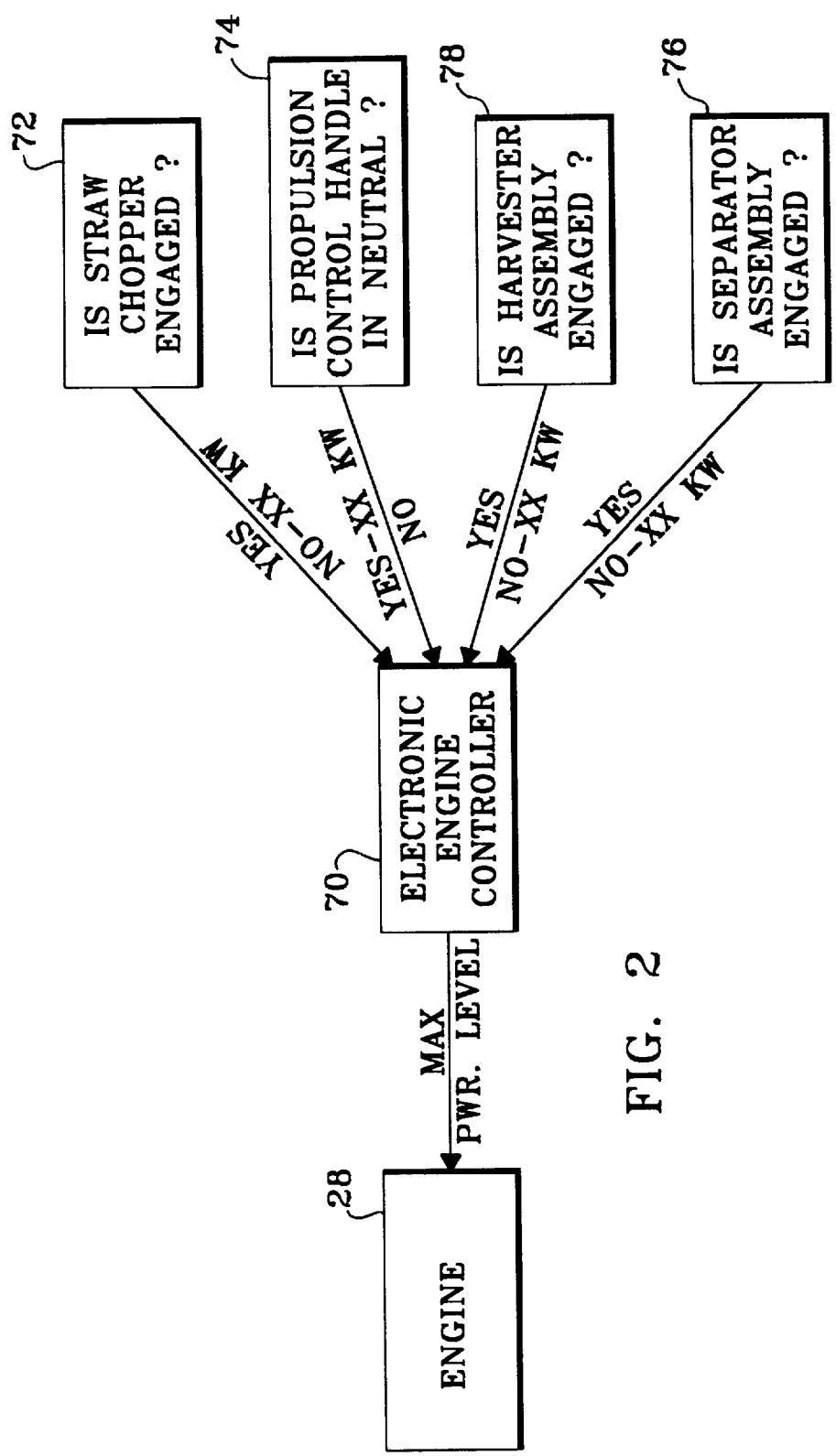
FIG. 2 is an electric schematic of the operation of the present invention.

FIG. 1 illustrates an agricultural combine 10 having a chassis 12 and ground engaging wheels 14 and 16. Forward ground engaging wheels 14 are driven by hydrostatic motor 18 located between the wheels. An operator seated in operator control cab 20 controls the operation of the combine. Harvesting platform 22 extends forwardly from the chassis of the combine and is used for harvesting a crop in the field. After harvesting, the crop is then directed through feeder house 24 into the combine.

Clean grain compartment 26 is located behind the operator's cab at the top of the combine. Behind compartment 26 is transverse internal combustion engine 28 which is the prime mover of the combine powering the propulsion assembly, the harvesting assembly and the threshing and separating assemblies. The internal combustion engine 28 is provided with a driving means 30 for powering the various usage assemblies. A better description of the drive assembly is contained in U.S. Pat. No. 4,843,803, assigned to the assignee of the present application, and which is incorporated herewith by reference.

Between the side sheets of the combine, which form the chassis 12 of the combine, are located the threshing and separating assemblies. The threshing and separating assemblies separates the grain from the straw and chaff of the harvested crop. The feeder house directs the harvested grain to a threshing assembly 31 which comprises a rotating transverse threshing cylinder 32, a transverse concave 34, and a rotating beater 38. As the crop passes between the cylinder 32 and the concave 34, grain and chaff fall through the concave to a pan 36 and the remaining crop material is advanced to the beater 38.

After threshing, the straw in the crop is advanced to a separating means 39. The main elements of the separating assembly are straw walkers 40. From the beater 38, the crop material is advanced to oscillating straw walkers 40 which direct the straw to the rear of the combine where it is received by straw chopper 44. The straw chopper in turn chops the remaining crop material into smaller components before it is returned to the field. Grain and chaff falling through the straw walkers falls onto an oscillating slanted pan 46 which directs the grain and chaff to the pan 36. The grain and chaff are directed from the pan 36 by overhead auger assemblies (not shown) to a cleaning shoe assembly 48 which is used to separate the chaff from the grain.

The grain and chaff falling onto the chaffer and sieve of the cleaning shoe assembly encounter an air stream from a fan 50 which blows the lighter chaff out the rear of the combine while the heavier grain falls through the cleaning shoe assembly and into a clean grain receiving auger 52. The auger 52 directs the clean grain to a clean grain elevator (not shown) which in turn directs the grain to the clean grain compartment 26. Tailings, that is unthreshed heads of grain, fall into a tailings auger 54 which directs the unthreshed heads back to the threshing cylinder and concave. When the clean grain compartment is to be unloaded, transverse unloading augers 56 direct the grain to the side of the compartment from where it comes into contact with a vertical unloading auger (not shown) which directs the clean grain through an unloading tube 58.

As discussed above the various crop processing assemblies are powered by an internal combustion engine 28. This engine is electronically connected to an electronic engine controller 70. In turn the electronic engine controller is in communication with four crop processing sensors. These sensors are on/off switches detecting whether the respective crop processing assembly is engaged. All of these switches are located in the operators cab 20.

The first sensor/switch is the straw chopper on/off switch 72. This switch is used to turn the straw chopper 44 on and off. The first sensor/switch is electronic communication with the electronic engine controller by suitable wires. The second sensor/switch is the propulsion assembly on/off switch 74. This sensor/switch is used to detect if the propulsion control handle is in its neutral position. It detects if the combine is being driven in forward or in reverse. The third sensor/switch is the separator on/off switch 76. This switch is used to operate the separator assembly 39. The fourth sensor/switch is the harvester assembly on/off switch 78. This sensor/switch is used to operate the harvesting equipment 22 located at the front of the combine.

Figure 3:
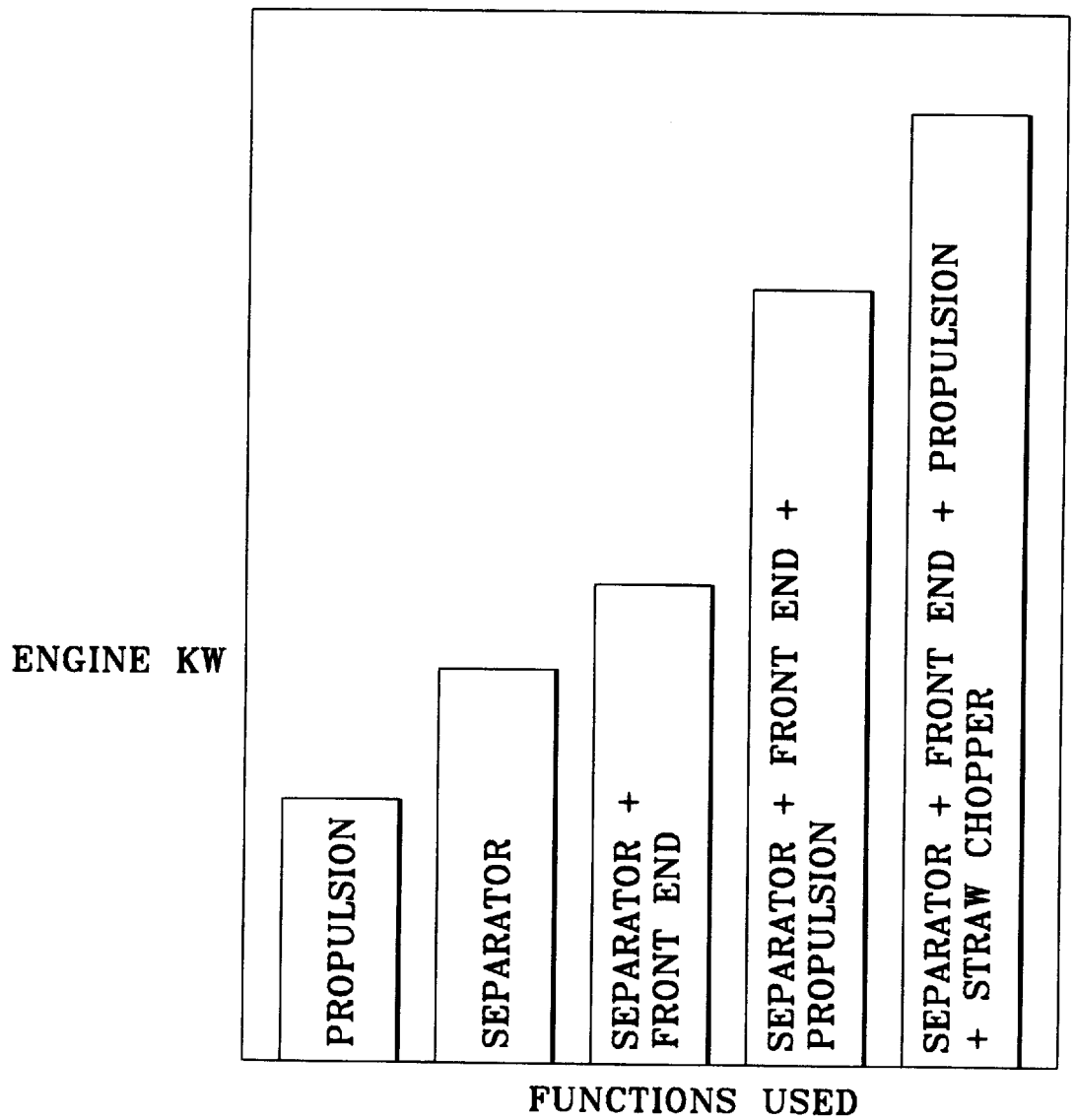
FIG. 3 is a bar chart of the power requirements of the various assemblies.

As illustrated in the bar chart of FIG. 3, different combinations of operating crop processing assemblies require different engine outputs. Therefore if the electronic engine controller detects the straw chopper is not engaged it reduces, that is it derates, the engine output by a specified amount. The electronic engine controller detects this condition by the open or closed position of straw chopper switch 72. Similarly if the propulsion control handle is in its neutral position engine power is not required to propel the combine in either forward or reverse. Therefore in response to the open or closed position of switch 74 the output of the engine is reduced by a specified amount required for propelling the combine. This similar situation exists for the other two switches 76 and 78 as well.

We claim:

1. An agricultural combine for harvesting, threshing, separating and cleaning an agricultural crop, said combine comprising;

a supporting structure;

a grain tank having walls is mounted to the supporting structure for temporarily storing grain;

ground engaging means extending from the supporting structure for transporting the supporting structure across a field;

a threshing assembly for threshing grain from harvested crop material;

a separating assembly for separating grain from the threshed crop, the separating assembly is controlled by a separator on/off switch;

a cleaning assembly for removing chaff from grain;

a harvesting assembly extending from the front of the supporting structure for harvesting an agricultural crop, the harvesting assembly is controlled by a harvesting on/off switch;

a propulsion assembly for driving the ground engaging means and propelling the supporting structure across a field, the propulsion assembly is controlled by a propulsion on/off switch;

a straw chopper for receiving crop material other than clean grain from the separator assembly and chopping this crop material into smaller components, the straw chopper is controlled by a chopper on/off switch;

an engine is mounted to the supporting structure for powering the threshing assembly, the separating assembly, the cleaning assembly, the harvesting assembly, the propulsion assembly, and the straw chopper; and an electronic engine controller is connected to the engine for controlling the maximum power level of the engine, the electronic engine controller is also connected to the separator on/off switch, the harvesting on/off switch, the propulsion on/off switch, and the straw chopper on/off switch, whereby if the one of the separator on/off switch, the harvesting on/off switch, the propulsion on/off switch, and the straw chopper on/off switch is in its off position the electronic engine controller reduces the maximum power level of the engine.

2. An agricultural combine for harvesting, threshing, separating and cleaning an agricultural crop, said combine comprising;

a supporting structure;

a grain tank having walls is mounted to the supporting structure for temporarily storing grain;

ground engaging means extending from the supporting structure for transporting the supporting structure across a field;

a threshing assembly for threshing grain from harvested crop material;

a separating assembly for separating grain from the threshed crop, the separating assembly is controlled by a separator on/off switch;

a cleaning assembly for removing chaff from grain;

a harvesting assembly extending from the front of the supporting structure for harvesting an agricultural crop;

a propulsion assembly for driving the ground engaging means and propelling the supporting structure across a field;

an engine is mounted to the supporting structure for powering the threshing assembly, the separating assembly, the cleaning assembly, the harvesting assembly, and the propulsion assembly; and an electronic engine controller is connected to the engine for controlling the maximum power level of the engine, the electronic engine controller is also connected to the separator on/off switch, whereby if the separator on/off switch is in its off position the electronic engine controller reduces the maximum power level of the engine.

3. An agricultural combine for harvesting, threshing, separating and cleaning an agricultural crop, said combine comprising;

a supporting structure;

a grain tank having walls is mounted to the supporting structure for temporarily storing grain;

ground engaging means extending from the supporting structure for transporting the supporting structure across a field;

a threshing assembly for threshing grain from harvested crop material;

a separating assembly for separating grain from the threshed crop;

a cleaning assembly for removing chaff from grain;

a harvesting assembly extending from the front of the supporting structure for harvesting an agricultural crop, the harvesting assembly is controlled by a harvesting on/off switch;

a propulsion assembly for driving the ground engaging means and propelling the supporting structure across a field;

an engine is mounted to the supporting structure for powering the threshing assembly, the separating assembly, the cleaning assembly, the harvesting assembly, and the propulsion assembly; and an electronic engine controller is connected to the engine for controlling the maximum power level of the engine, the electronic engine controller is also connected to the harvesting on/off switch, whereby if the harvesting on/off switch is in its off position the electronic engine controllerreduces the maximum power level of the engine.

4. An agricultural combine for harvesting, threshing, separating and cleaning an agricultural crop, said combine comprising;

a supporting structure;

a grain tank having walls is mounted to the supporting structure for temporarily storing grain;

ground engaging means extending from the supporting structure for transporting the supporting structure across a field;

a threshing assembly for threshing grain from harvested crop material;

a separating assembly for separating grain from the threshed crop;

a cleaning assembly for removing chaff from grain;

a harvesting assembly extending from the front of the supporting structure for harvesting an agricultural crop;

a propulsion assembly for driving the ground engaging means and propelling the supporting structure across a field, the propulsion assembly is controlled by a propulsion on/off switch;

an engine is mounted to the supporting structure for powering the threshing assembly, the separating assembly, the cleaning assembly, the harvesting assembly, and the propulsion assembly; and an electronic engine controller is connected to the engine for controlling the maximum power level of the engine, the electronic engine controller is also connected to the propulsion on/off switch, whereby if the propulsion on/off switch is in its off position the electronic engine controllerreduces the maximum power level of the engine.

* * * * *

UNITED STATES PATENT AND TRADEMARK OFFICE
CERTIFICATE OF CORRECTION

PATENT NO. : 5,878,557
DATED : 9 March 1999
INVENTOR(S) : Michael Keith Wyffels et al.

It is certified that error appears in the above-indentified patent and that said Letters Patent is hereby corrected as shown below:

Column 5, line 15, delete controllerreduces and insert "--controller reduces--"

Column 6, line 23 delete controllerreduces and insert "--controller reduces--"

Signed and Sealed this

Eighth Day of February, 2000

*Attest:*

Q. TODD DICKINSON

*Attesting Officer*    *Commissioner of Patents and Trademarks*